Feb. 2, 1937.　　　E. MAHLER ET AL　　　2,069,257
PROCESS OF AND APPARATUS FOR MANUFACTURING
ARTIFICIAL LEATHER OR THE LIKE
Filed July 5, 1934　　　3 Sheets-Sheet 1
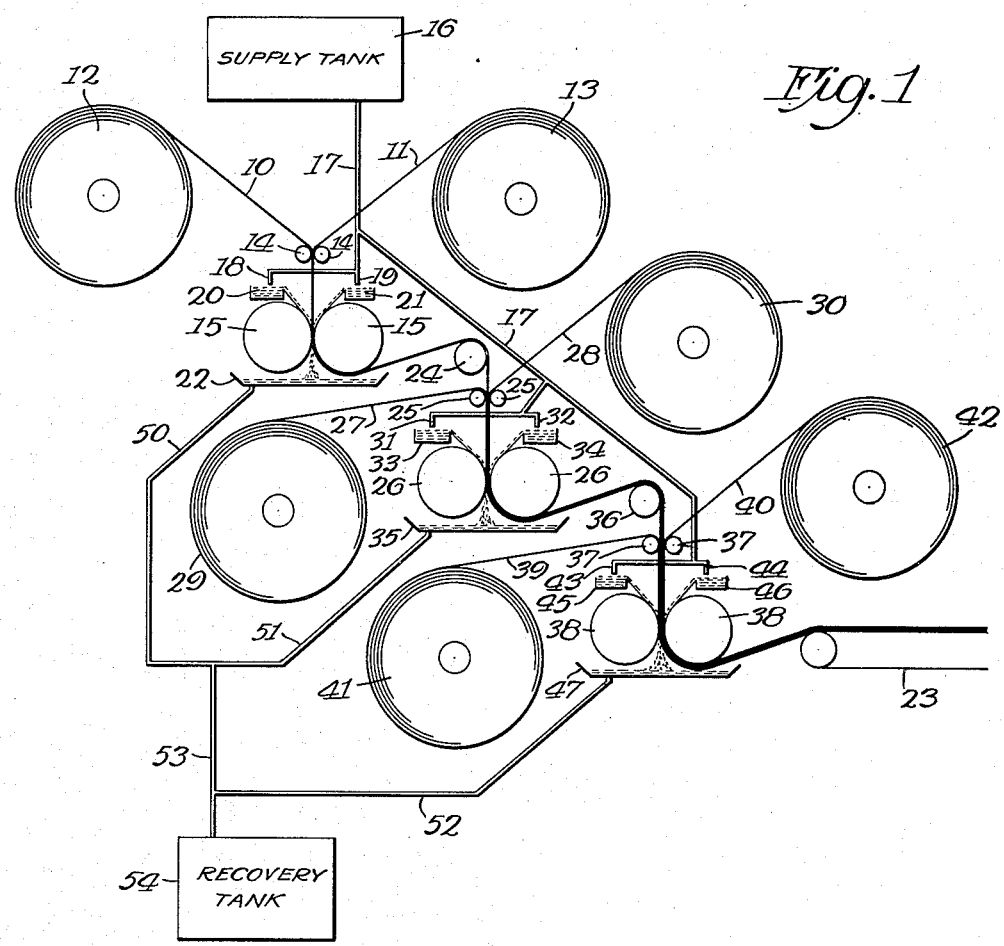
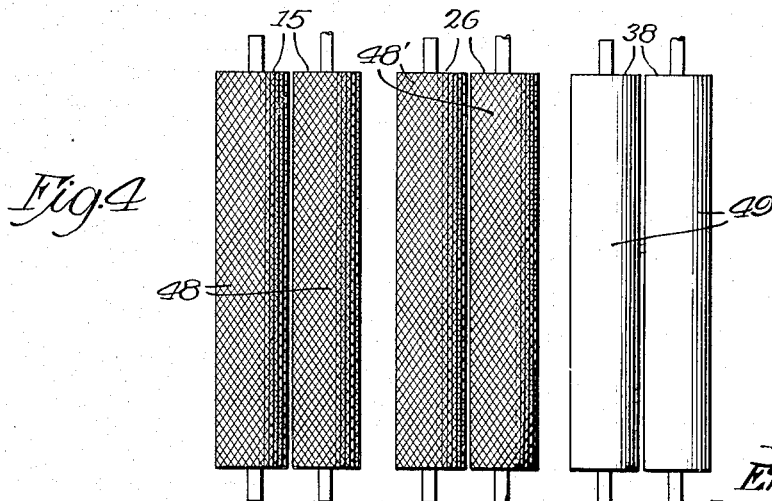
Inventors:
Ernst Mahler
John B. Catlin
By Fisher, Clapp, Soans & Pond, Attys.

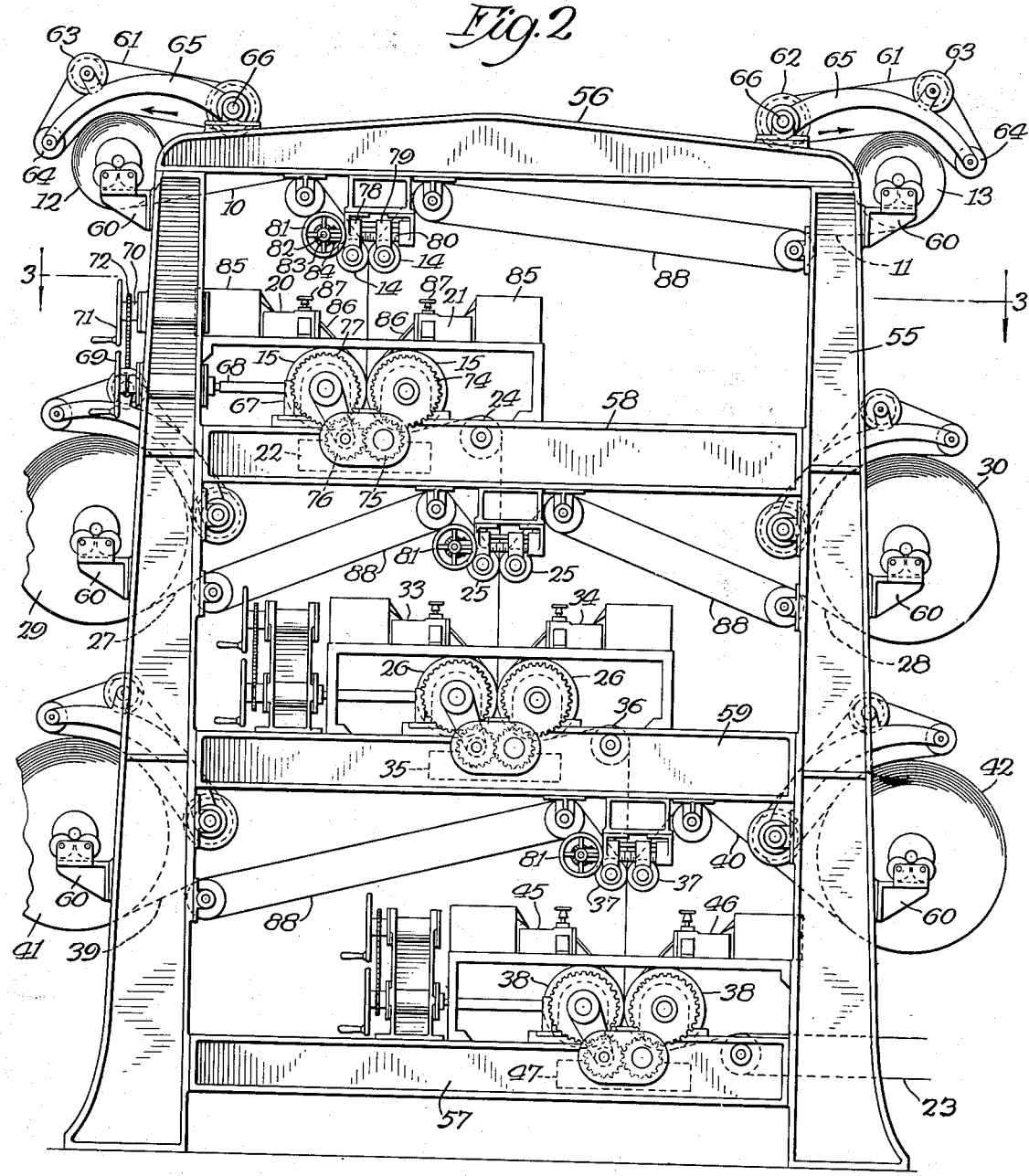

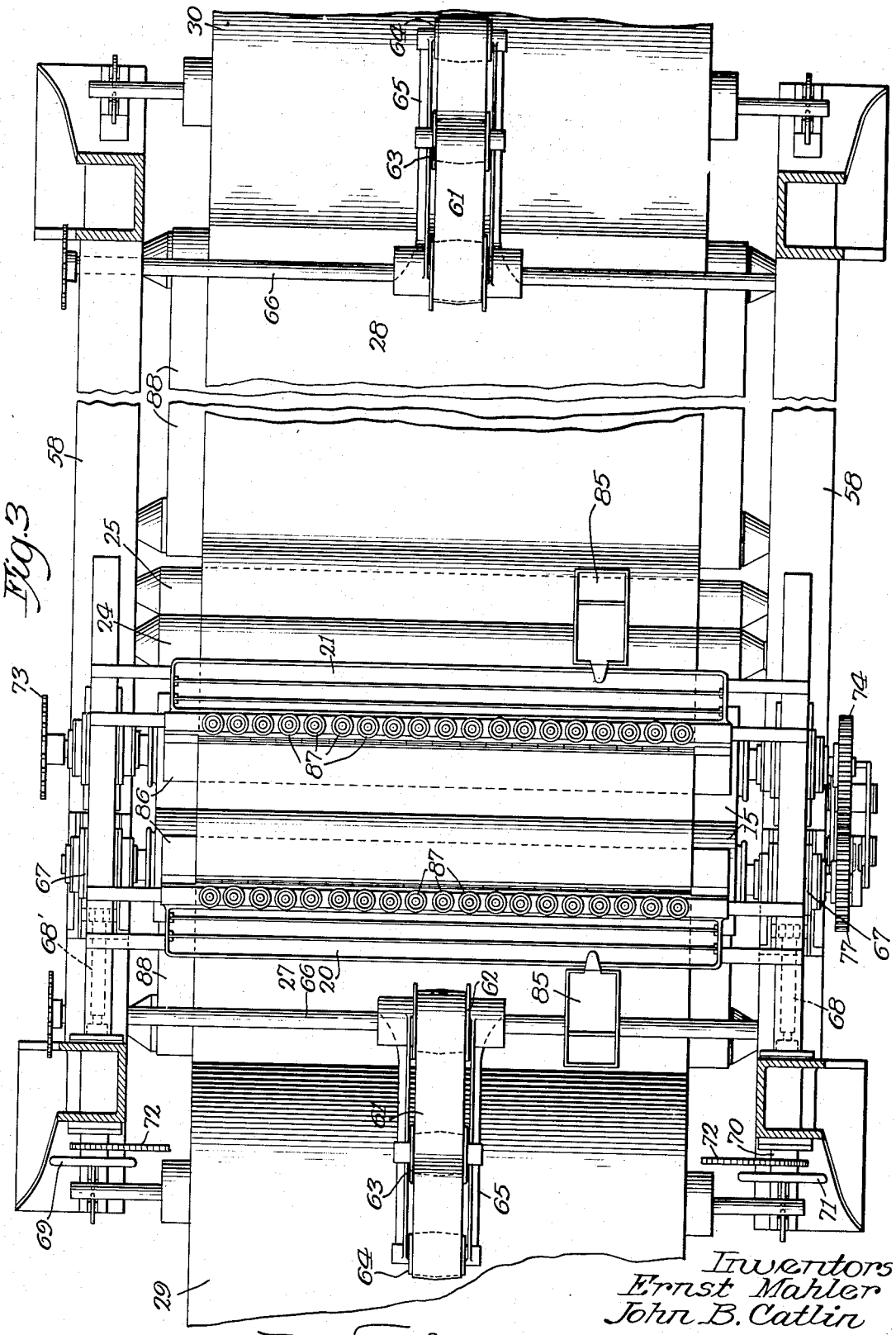

Patented Feb. 2, 1937

2,069,257

UNITED STATES PATENT OFFICE 2,069,257

PROCESS OF AND APPARATUS FOR MANUFACTURING ARTIFICIAL LEATHER OR THE LIKE

Ernst Mahler, Neenah, and John B. Catlin, Appleton, Wis., assignors to Paper Patents Company, Neenah, Wis., a corporation of Wisconsin Application July 5, 1934, Serial No. 733,936

8 Claims. (Cl. 154—40)

This invention deals with the fabrication of artificial leather or leather substitutes and like materials, its general object being to produce a homogeneous material suitable for use in making upholstered furniture, hand bags, belts, automobile tops, insoles, shoe findings, and other articles in the manufacture of which artificial leather and similar materials may be usefully employed.

The improved process, as applied to rubberized products, involves the impregnation of several plies of light tissue paper or crepe wadding with rubber latex so that the rubber content will vary from 50% to 150% on the weight of the cellulose fiber, according to the intended purpose or use of the product. The volatile portion of the latex is removed by drying, and the rubber may be vulcanized if desired. The dried material is calendered to the required thickness and cut or trimmed to suitable size.

Referring first to some faults and defects of the known art for a better understanding and appreciation of our improvements, at the present time most artificial leather similar to the type above mentioned and of a greater thickness than .020 inch exhibits a wire mark due to the method of manufacture. This mark destroys the leather-like appearance and increases the amount of coating required to produce continuous non-cracking films. In certain materials the wire mark is only faintly discernible. Its intensity has been reduced by hard calendering or similar application of pressure, but this tends to make the material dense or board-like, destroying its flexibility and softness.

In certain processes described in the patent and other literature of the art the proportions of rubber to cellulose cannot be varied over a wide range. Hence, products of widely different physical properties cannot be made by such processes.

Some leather substitutes are produced by a laminating process. Where it is not possible or practical to produce a homogeneous material of the desired final thickness, two or more layers are pasted together; and where certain properties are desired on one side and different properties on the other, laminated substitutes are used. The laminating process does not produce homogeneous products. The laminated interface is always noticeable and is frequently objectionable. Aside from involving additional expensive operations, laminating imparts undesirable properties to the finished goods. For example, it tends to increase stiffness, particularly when three or more layers are present, and decrease porosity.

The leather substitutes on the market today possessing high initial resistance to tear are produced from long, relatively expensive fibers. While the desired strength effect is obtained with such fibers, sheets made with them exhibit a marked paper-break or piping,—which may be defined as wrinkles appearing as small hills and valleys on the concave side of the material when the latter is bent or flexed. Fine real leathers possess very fine pipings. Consequently, long-fibered substitutes differ from real leather as regards piping or wrinkling characteristics.

Again, because of structure, density, and poor stretching characteristics under applied tension loads, artificial leathers now available mold poorly. It is practically impossible, for example, to mold the crown portion of a football helmet with the present leather substitutes.

The improved process of our present invention produces an artificial leather or like material either not exhibiting, or possessing in a lesser degree, the undesirable properties and characteristics above pointed out.

Turning now to an illustrative description of our process when using latex as the filling and binding agent, from ten to thirty plies of light creped tissue paper are unwound in the form of two bats each made up of from five to fifteen plies from a pair of parent rolls and fed in opposite directions into lateral juxtaposition and then into the nip of two horizontal press rolls. Rubber latex solution capable of being absorbed by the bats is continuously flowed into the roll nip on the outer sides only of the bats from a suitable head box or weir and is absorbed by the bats. The saturated sheet is lightly pressed to squeeze out excess latex, and the wet sheet thus formed is withdrawn continuously from the press rolls and admitted to a drier. If a thicker material than can be made from the two bats alone is desired, the sheet leaving the first press rolls is threaded into a second like pair of press rolls between a second pair of bats of dry wadding, rubber latex is continuously flowed into the nip of the second press rolls between the latter and the second pair of bats, thus saturating the added dry bats, the whole being then lightly pressed to remove excess latex, and this adding operation may be repeated any number of times to build up a final sheet of any desired thickness, which is then dried to drive off the volatile ingredient of the latex. In all cases the final product, whether a comparatively thin sheet formed by a single pair of press rolls or equivalent compressing instrumentality or a thicker sheet formed by a plurality of pairs of press rolls with dry bats added at each succeeding pair of press rolls, is a homogeneous structure consisting of crepe tissue uniformly impregnated and filled from side to side with rubber,—and not a laminated structure with the latex acting as a cement to bond the several bats of wadding together.

Where but a single pair of press rolls is employed to make the finished article, these press rolls will be smooth faced, since such rolls leave no wire mark on the wet formed sheet, and therefore the finished product does not possess a wire mark at any density. And it may here be remarked that the density of the finished product may be determined by regulating the pressure between the press rolls. Where, however, the thickness is built up by successively adding and saturating other dry bats of wadding through the agency of additional press rolls, the rolls preceding the last pair may, for reasons later explained, be either wire covered or knurled, the rolls of the last pair being smooth-faced to eliminate from the surfaces of the wet sheet the markings formed by the preceding pairs of rolls.

In the accompanying drawings we have illustrated, somewhat diagrammatically, an apparatus well adapted to carry out our improved process of manufacturing an artificial leather, and referring thereto:

Fig. 1 is a diagrammatic view, illustrating one method of building up a product of substantial thickness by successively integrating with an original latex-impregnated sheet additional bats of crepe tissue and simultaneously impregnating the latter with latex and conducting the final product to a drier.

Fig. 2 is a side elevation of a machine employing three pairs of press rolls and crepe wadding and latex supplying agencies associated therewith.

Fig. 3 is a plan section on the line 3—3 of Fig. 2.

Fig. 4 is a plan view of the first, second and third pairs of press rolls, showing preferred surface formations.

First briefly describing in outline the process of manufacture in connection with the diagrammatic view, Fig. 1, two bats 10 and 11, each comprising from five to fifteen plies of light creped tissue paper, are unwound from parent rolls 12 and 13 and brought into lateral juxtaposition by and between a pair of guide rolls 14 that overlie a pair of press rolls 15 between which the two bats pass. A rubber latex or other solution from an overhead supply tank 16 flows through a pipe 17 and branch pipes 18 and 19 into a pair of weirs 20 and 21, whence the solution is uniformly directed into the nip of the press rolls 15 on either side of the paper wadding, and is absorbed by the latter. Between the press rolls 15 the saturated sheet is lightly pressed to remove the excess solution, which is caught in a pan 22; and at this point, if only a thin product is wanted, the formed wet sheet is removed continuously from the press rolls and conveyed on a belt, such as 23, to a suitable dryer. In this case the press rolls 15 will be smooth surfaced, as indicated at 49 in Fig. 4, so as to leave the surfaces of the product perfectly smooth and free from wire or pock marks.

If, however, a thicker product is desired, the sheet leaving the first press rolls 15 may be passed over a delivery roll 24, thence between a pair of guide rolls 25, similar to the guide rolls 14, and then threaded into a second pair of press rolls 26. Two more bats 27 and 28, similar to the bats 10 and 11, are unwound from rolls 29 and 30 and added to the previously saturated sheet at the nip of the guide rolls 25, the four bats passing together between the press rolls 26. Latex or other solution is also supplied to the nip of rolls 26 by branches 31 and 32 from the supply pipe 17 and weirs 33 and 34, the solution being absorbed by the additional bats 27, 28 just before the latter pass between the press rolls, so as to uniformly saturate the additional bats and integrate them with the original bats 10, 11. Excess solution pressed out by rolls 26 is caught in a pan 35 underlying the press rolls 26. If this gives a product of the desired thickness, the saturated sheet may then be conducted by a belt, such as 23, into the dryer. In this case the first pair of press rolls will preferably be wire covered, as shown at 48 in Fig. 4, and the second pair will be smooth surfaced to iron out the wire marks left on the wet sheet by the first pair of press rolls.

And if a still thicker product is desired, the addition of more wadding and solution may be repeated in the same manner, the sheet leaving the second press rolls 26 being passed over a delivery roll 36, thence between a pair of guide rolls 37, and then threaded into a third pair of press rolls 38. Two more bats 39 and 40 of creped tissue paper are unwound from rolls 41 and 42 and added to the previously saturated sheet at the nip of the guide rolls 37, the six bats passing together between the press rolls 38. Latex or other solution is also supplied to the nip of rolls 38 by branches 43 and 44 from the supply pipe 17 and weirs 45 and 46, the latex being absorbed by the additional bats 39 and 40 so as to uniformly saturate the additional bats and integrate them with the previously added bats 27 and 28. Excess solution pressed out by rolls 38 is caught in a pan 47 underlying the press rolls 38. The saturated sheet may then be conducted by belt 23 into the dryer. In this case, the first and second pairs of press rolls will preferably be wire covered, as shown at 48 and 48' in Fig. 4, and the third or last pair will be smooth surfaced, as shown at 49.

The excess solution from the pans 22, 35 and 37 may be drained through pipes 50, 51, 52 and 53 into a recovery tank 54, whence it may be pumped back to the supply tank 16.

Figs. 2 and 3 of the drawings illustrate the principal features of an organized machine that embodies the parts schematically illustrated in the diagrammatic view Fig. 1, together with several adjunctive devices for sensitively adjusting the pressures applied at the press rolls, adjusting the guide rolls, controlling the amount of solution flowing to the weir boxes, unwinding the tissue sheets or bats from their several rolls and controlling the tension or "draw" in the same between the roll and press, conveying the sheets or bats from their rolls to the press rolls, etc.

In these views the parts previously described in connection with Figs. 1 and 4 are identified by the same reference numerals and will be readily recognized.

The several rolls of creped tissue stock and the operating parts of the machine are mounted on a suitable frame structure comprising parallel duplicate side frame members 55, each including horizontal top and bottom cross-beams 56 and 57 and intermediate cross-beams 58 and 59. On the outer upright edges of the frame members 55 are brackets 60 supporting anti-friction bearings for the pintles of the several wadding rolls. These rolls are positively driven so as to unwind the wadding strips at a constant linear rate of travel in each case by a belt 61 trained over rollers 62, 63 and 64 mounted on an arm 65 that is pivoted on a shaft 66 journaled on and between the side frames 55. The roller 62 is keyed to shaft 66 which is a driven shaft, and the weight of the arm, rollers and belt causes the latter to frictionally and drivingly engage with the surface of the wadding roll, maintaining such engagement automatically as the diameter of the roll decreases. By varying the speed of drive of the belt 61, the stretch or "draw" of the bat between the wadding roll and the press rolls may be varied as desired.

The density of the product is determined mainly by the degree of compression exerted on the wet bats between the several pairs of press rolls. Accordingly, provision is made for varying this pressure by rendering one of each pair of press rolls bodily adjustable toward and from the other. For example, in case of the upper press rolls 15 the pintles of the left hand roll (viewing Fig. 2) are journaled in bearing blocks 67 that are slidable on the beam 58, and the bearing blocks 67 are adjusted horizontally by suitably journaled shafts 68 having threaded engagement with the blocks 67 and equipped on their outer ends with hand wheels 69 for rotating them. This adjusting means, of course, is provided on both sides of the machine, and for convenience of operating the rear adjusting device from the front of the machine, we provide, above the shaft 68, a shaft 70 equipped with a hand wheel 71 and having a chain and sprocket connection 72 to an adjusting shaft 68' (Fig. 3) on the rear of the machine. The two ends of the press roll 15 are thus independently adjustable so that exact parallelism of the two press rolls may be easily obtained. For driving the press rolls, the shaft of the right hand roll 15 is provided with a driving sprocket 73 on its rear end, and with a gear 74 on its front end which latter, through a pair of idler gears 75 and 76 drives a gear 77 on the mating press roll 15. The above described roll adjusting and driving mechanism is duplicated in the case of the second and third press rolls, as will be evident from inspection of Fig. 2.

The several pairs of guide rolls 14, 25 and 37 are also preferably provided with means for adjusting the width of their nip on the bats of wadding that are merged in the nip. For example, in the case of the guide rolls 14, one of these rolls is journaled in a fixed hanger 78, while the other is journaled in an adjustable hanger 79 engaged and supported by a suitably journaled screw threaded rod 80 actuated by a hand wheel 81 on a stub shaft 82 and miter gears 83 and 84 on shaft 82 and rod 80 respectively. This adjustment is duplicated in the cases of the guide rolls 25 and 37.

It is important that the flow of liquid latex into the nips of the several press rolls be rendered uniform throughout the full width of the bats, and for this purpose the machine is preferably equipped, in connection with each of the weir boxes, such as 20 and 21, with a metering weir box 85 located in rear of and delivering to the weir box or sluice such as 20, 21. These graduated metering weir boxes 85 control the amount of latex flowing to the weir boxes 20 and 21, and the latter are preferably supplied with sectional overflow aprons 86 formed on their upper edges with lips that may be independently raised and lowered by screws equipped with hand wheels 87. By this means an evenly distributed flow of latex across the full width of the apron may be secured. A thin rubber sheet (not shown) is stretched over the adjustable lips and apron.

The offset arrangement of press rolls shown in Figs. 1 and 2 enables the sheet to clear excess solution flowing off the roll nip. In the arrangement shown, the crepe wadding drawn from the rolls 13, 29, 30 and 41 travels a considerable distance from each wadding roll to its associated press rolls, and accordingly we provide in the frame of the machine suitably located conveyor belts 88 that constitute traveling supports for the sheets of wadding and thus prevent danger of the latter tearing or breaking while enroute to the press rolls. In the cases of the wadding rolls 12 and 42, the distance of travel is so short that the conveyor belts may be omitted.

We have discovered that the nature of the press roll surface exerts a profound influence on sheet properties. Generally speaking, smooth faced rolls produce material with the lowest stretch; knurled rolls produce material with higher stretch; and wire faced rolls produce material with the greatest stretch.

Smooth faced rolls are in intimate contact with the material being impregnated. Consequently, the cohesion forces at the roll-fiber interface are at a maximum, and a minimum roll-nip pressure must be used to prevent the roll-contacting parts of the wet sheet from sticking to the roll instead of to the sheet itself. Thus, impregnation must proceed by natural absorption and the sheet must be practically saturated before it reaches the point of minimum clearance in the roll nip. Since the outer surface of the wadding comes in contact with the solution first, the outside plies are saturated soonest. To prevent wrinkles the entire bat of wadding must be subjected to sufficient tension to compensate for the increment in solution concentration and resultant difference in sheet strength between the sheet surface and center. In other words, because of the difference in absolute time at which any two plies contain the same amount of solution, the plies tend to move through the machine at different speeds— the inside or dry plies moving most rapidly. The tension and consequent loss of stretch results from the necessity for stretching the inside plies as much as the outside.

Wire faced rolls are not in intimate contact with the material being impregnated. Their surfaces are relatively discontinuous. The actual roll-fiber interface area is, therefore, considerably less when using wire faced instead of smooth faced rolls. Thus high pressure can be applied by the surface of any single or group of wires in the wire face proper, and yet the average nip pressure per unit of area is low. This concentration or pressure materially alters machine operation and the type of product produced. The high localized pressure accelerates impregnation. Wire faced rolls will impregnate twenty plies, for instance, twice as rapidly as smooth faced rolls. Thus the sheet can be relatively dry when it reaches the nip but be impregnated when it leaves. From the considerations already discussed it is apparent that less crepe or stretch is pulled out of the wadding.

Knurled-face rolls act intermediately between smooth and wire faced rolls in their effect on the stretch of the product. The depth and kind of knurling determine the specific effects. The character of roll surface exerts one other effect, namely, in controlling the density of the wet sheet and the condition of the latex or other solution in the same.

Wet sheets made on smooth faced rolls alone are soft and of low density, partly due to the low pressure used to prevent the sheet from sticking to the press rolls. The wet strength is low and consequently the sheet is weak and difficult to handle on conveyors, carrying rolls, etc. Furthermore, because of its high porosity, the rubber particles in the latex migrate to the surface of the sheet during drying. This increases drying time, makes the sheet surface rubbery, and lowers the rubber efficiency as indicated by ply adhesion, tear strength, etc.

Wet sheets properly made on wire surfaced rolls are relatively hard and of high density, partly due to the higher pressure used in the press rolls. The wet strength is high and consequently the sheet is strong and easy to handle on conveyors, carrying rolls, etc. The high density or low porosity makes it difficult for rubber particles to leave their initial location. When properly made, approximately 50% of the latex is coagulated in the wet sheet as it leaves the roll nip. The coagulated rubber is deposited on the fiber surfaces by a process of pressure filtration.

These differences in wet sheet properties require widely different latex properties to produce satisfactory material.

To eliminate migration during drying, smooth surfaced sheets have to be made with relatively unstable latex. We have found that latex relatively free from serum or non-rubber constituents is approximately suited to requirements. Using smooth faced rolls we prefer to use a relatively unstable latex concentrated by centrifuging to which a zinc oxide dispersion in an acetylated-starch water solution is added so that 10% zinc oxide is present, based on the weight of the dry latex rubber.

The mechanical work done on the latex by wire faced rolls demands a relatively stable latex to prevent coagulation on the machine and subsequent operating difficulties. Due to the nature of the sheet an unstable latex is not required to prevent drying migration. Thus when using wire faced rolls, it is not necessary to pay a premium for latex containing high proportions of hydrocarbon. The normal liquid latex of commerce stabilized with ammonia can be successfully used.

In view of the foregoing considerations as to the character of the roll surface and the character of latex when making, for example, a leather substitute suitable for use as an insole in women's shoes by an apparatus such as that herein shown and described, the first pair of press rolls 15 will preferably be wire faced rolls, the second pair of press rolls 26 will also preferably be wire faced rolls, and the third or last pair of press rolls 38 will be smooth faced rolls, as indicated in Fig. 4. The latex used in association with the first and second pairs of rolls will preferably be a relatively stable latex, such as the normal liquid latex of commerce, while the latex employed in association with the smooth faced rolls 38 will preferably be a relatively unstable latex such as that above described. The use of the wire faced rolls in the first and second operations on the sheet creates a desirable degree of density in the sheet and at the same time prevents migration of the rubber particles to the surface during the subsequent drying operation, while the use of the smooth faced rolls in the final step, in connection with a relatively unstable latex, removes the wire marks from the surfaces of the product, eliminates migration during drying, and prevents wrinkling or piping.

The economic advantages of the process are numerous, and these will be readily understood and appreciated by persons skilled in the art. Manifestly, by the employment of a greater or less number of successive press rolls and wadding and solution supply devices, products of widely varying thickness can be made, and 100-ply material can be made at the same speed as 20-ply material. And while the product is made by a process closely resembling laminating heretofore used in connection with adhesives, the product is a homogeneous, and in no sense a laminated, product.

The process also lends itself readily to the use of fillers and binders other than rubber. We have found that many useful and valuable products such, for example, as oil cloth substitutes, can be made using non-rubber fillers and binders. For examples, water dispersions, and solvent solutions of shellac, rosin, wood pitches, coal tar pitches, petroleum and native asphalts and asphaltites, mineral and vegetable waxes, natural resins and gums like damar, Kauri, copal, etc., synthetic resins, such as phenol-aldehyde, rezyls or glyptols, vinyl, "Plioform", "Thiokol", and "Du Prene", carbohydrates such as starch and modified starches, proteins like casein and gelatin, and the various albuminoids can be successfully used.

Although the chief contemplated use of our improved process is in the manufacture of leather substitutes, the process offers the same advantages in the fields above mentioned.

We claim:

1. A process of fabricating a product of the character described, which consists in continuously moving a bat of creped tissue wadding through a compression zone, saturating said bat with a filling and binding liquid before it passes through said zone, continuously moving the wet bat through one or more additional compression zones, moving dry bats of similar material into contact with both sides of the wet bat at each said additional zone or zones and compressing them onto said wet bat, saturating said dry bats with a filling and binding liquid before they pass through said additional zone or zones, and then drying the resultant article.

2. A process of fabricating a smooth surfaced sheet product of the character described, which consists in continuously feeding a bat of creped tissue wadding successively through a plurality of compression zones, saturating said bat with a filling and binding liquid before it passes through the first of said zones, adding dry bats of similar material to both sides of the wet bat at each following compression zone, saturating said added bats with a filling and binding liquid before passing through each following compression zone, smoothing the surfaces of the built-up sheet in the last compression zone, and then drying said sheet.

3. A process of manufacturing a smooth surfaced rubberized leather substitute, which consists in continuously feeding a bat of creped tissue wadding through one or more pairs of discontinuous-surfaced press rolls and through a final pair of smooth-surfaced press rolls, continuously feeding additional bats into the pairs of press rolls beyond the first pair and compressing them with said first named bat, supplying the nips of said discontinuous-surfaced rolls with a stable rubber latex in an amount to saturate the bats passing therethrough, supplying the nip of said smooth-surfaced rolls with an unstable rubber latex in an amount to saturate the bats added at said smooth-faced rolls, and drying the resultant article.

4. Apparatus for manufacturing a smooth-surfaced sheet product of the character described, comprising one or more pairs of discontinuous-surfaced press rolls and a final pair of smooth-surfaced press rolls arranged in series, means for guiding a bat of creped tissue wadding through the several press rolls, means for guiding additional bats of creped tissue wadding into the nip or nips of the pair or pairs of press rolls beyond the first pair, and weir boxes for continuously delivering a filling and binding liquid to the nips of the several rolls of the series.

5. A process of fabricating a homogeneous product of the character described, which consists in continuously moving a plurality of bats each made up of a plurality of plies of creped tissue paper into lateral juxtaposition, continuously flowing upon the outer sides only of the bats a filling and binding liquid capable of being absorbed by the bats in a quantity sufficient to saturate the bats, then compressing the bats to squeeze out excess liquid and combine the two bats into one, and then drying the combined bat.

6. A process of fabricating a homogeneous product of the character described, which consists in continuously moving a plurality of bats each made up a plurality of plies of creped tissue paper into lateral justaxposition, passing the bats between a pair of smooth-faced press rolls and simultaneously flowing upon the outer sides only of the bats at the nip of the press rolls a filling and binding liquid capable of being absorbed by the bats in a quantity sufficient to saturate the bats, and then directly drying the combined bat.

7. A process of manufacturing a smooth-surfaced rubberized sheet product of the character described, which consists in continuously moving a plurality of bats each made up of a plurality of plies of creped tissue paper into lateral juxtaposition, passing the bats between a pair of smooth-faced press rolls and simultaneously flowing upon the outer sides only of the bats at the nip of the press rolls an unstable rubber latex solution in a quantity sufficient to saturate the bats, and then directly drying the combined bat.

8. Apparatus for manufacturing a smooth-surfaced sheet product of the character described, comprising one or more pairs of discontinuous-surfaced press rolls and a final pair of smooth-surfaced press rolls arranged in series, means for guiding a bat of creped tissue wadding through the several press rolls, means for guiding additional bats of creped tissue wadding into the nip or nips of the pair or pairs of press rolls beyond the first pair, and means for continuously delivering a filling and binding liquid to the nips of the several rolls of the series.

ERNST MAHLER.
JOHN B. CATLIN.